C. E. PHENICIE.
ICE CREAM CUTTER.
APPLICATION FILED MAR. 2, 1918.
1,277,116.
Patented Aug. 27, 1918.
2 SHEETS—SHEET 1.
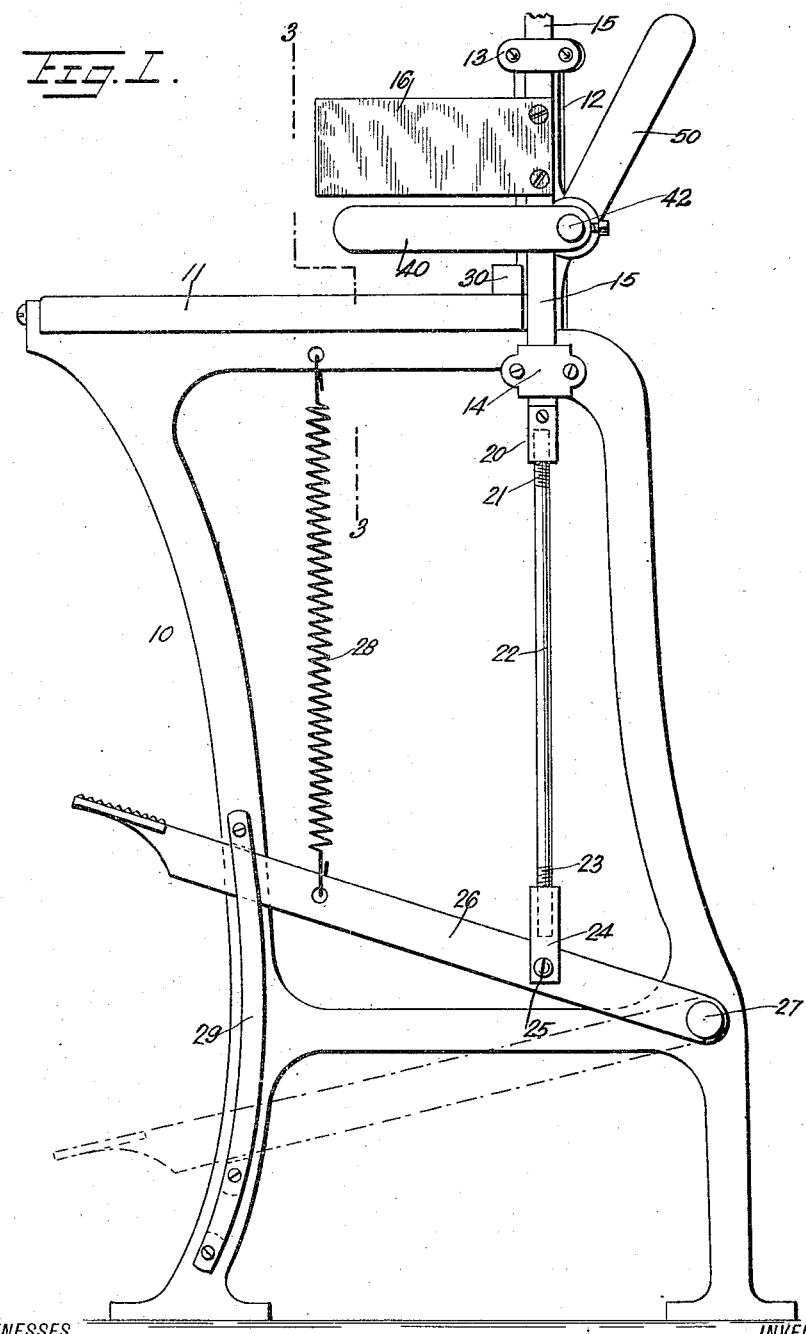
WITNESSES
H. J. Walker
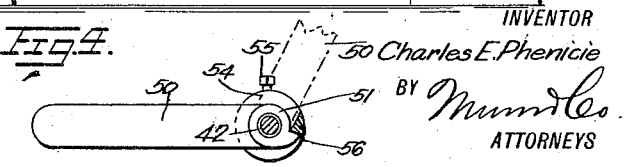
INVENTOR
Charles E. Phenicie
BY
ATTORNEYS

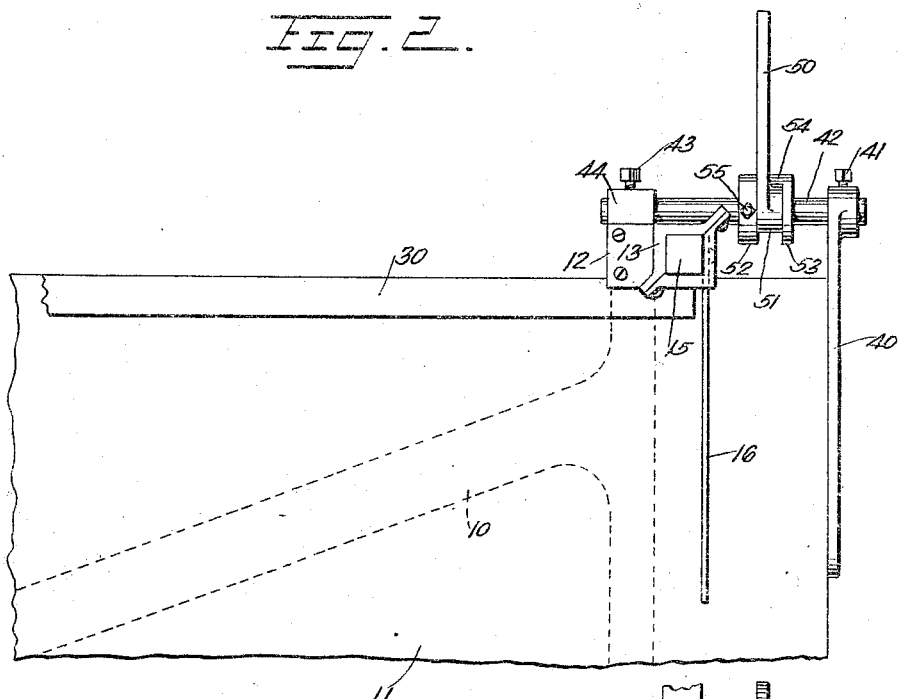
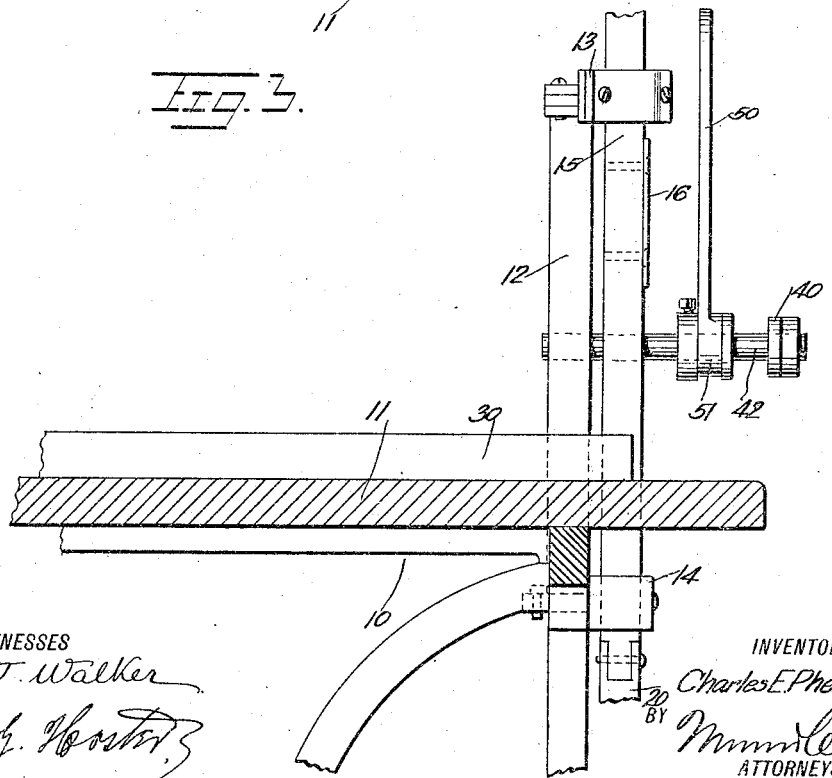

UNITED STATES PATENT OFFICE.

CHARLES ELMER PHENICIE, OF TACOMA, WASHINGTON.

ICE-CREAM CUTTER.

1,277,116.　　　　　Specification of Letters Patent.　　Patented Aug. 27, 1918.

Application filed March 2, 1918. Serial No. 219,987.

*To all whom it may concern:*

Be it known that I, CHARLES E. PHENICIE, a citizen of the United States, and a resident of Tacoma, in the county of Pierce and State of Washington, have invented a new and Improved Ice-Cream Cutter, of which the following is a full, clear, and exact description.

The object of the invention is to provide a new and improved ice cream cutter more especially designed to cut ice cream into bricks. Another object is to permit of cutting the ice cream brick into slices. Another object is to insure accurate cutting of the ice cream with a view to form bricks or slices of uniform sizes.

In order to accomplish the desired result use is made of a table adapted to support a block of ice cream, a knife mounted to move up and down above the table to cut the block into bricks or the latter into slices, a fixed gage spaced from the said knife a distance corresponding to the length of an ice cream brick, and a second gage adapted to be swung into active position intermediate the knife and the said first-named gage to permit of cutting an ice cream brick into slices.

A practical embodiment of the invention is represented in the accompanying drawings forming a part of this specification, in which similar characters of reference indicate corresponding parts in all the views.

Figure 1 is an end elevation of the ice cream cutter;

Fig. 2 is a plan view of the same;

Fig. 3 is a sectional front elevation of the same, on line 3—3 of Fig. 1; and

Fig. 4 is a sectional side elevation of the second gage in active position when cutting an ice cream brick into slices.

In the manufacture of ice cream bricks as heretofore practised it has been customary to first run the liquid ice cream into a mold about 25 inches long, 6½ inches wide and 3 inches deep. The mold and its contents are next placed into a refrigerator to freeze the ice cream into a block, which is then removed from the mold and placed on the table and cut across into eight pieces, commercially known as ice cream bricks. The cutting is done by the use of a large knife wielded by an operator, and the knife is applied on the ice cream block along faint depressed line marks extending across the block and formed by providing ridges in the mold. This cutting process is naturally slow and inaccurate as the operator frequently has difficulty in seeing the faint cutting marks with the result that the ice cream bricks are of uneven size. With my improved ice cream cutter presently described in detail, the ice cream block is not only cut into accurate ice cream bricks but each brick can be cut into slices whenever it is desired to do so.

On a suitably constructed stand 10 is mounted a table 11, preferably of marble or similar material. On the stand 10 is erected a post 12 at the rear of the table 11, and the said post is provided with bearings 13 and 14 in which is mounted to slide up and down a bar 15 carrying a transversely extending knife 16 disposed above the table 11, and serving to cut a block of ice cream into bricks or a brick into slices, as hereinafter more fully explained. The lower end of the bar 15 is provided with a sleeve 20 in which screws the upper threaded end 21 of a rod 22 provided at its lower end with a threaded portion 23 screwing into a sleeve 24 pivotally connected at 25 with a treadle 26 fulcrumed at 27 on the stand 10. The treadle 26 is connected with the lower end of a spring 28 attached to the stand 10 and serving to hold normally the treadle 26 in uppermost position and likewise the knife 16. The treadle 26 extends through a guideway 29 attached to the stand 10 and the said guideway limits the downward swinging movement of the treadle 26 when the latter is pressed on by the foot of the operator standing in front of the table 11. When the treadle 26 is pressed down until it strikes the bottom of the guideway 29 then the cutting edge at the bottom of the knife 16 is directly above the top of the table 11 thus preventing the cutting edge from cutting into the table and being injured thereby. In order to allow accurate adjustment of this movement, the threaded portions 21 and 23 of the rod 22 are provided one with a right-hand thread and the other with a left-hand thread so that on turning the rod 22 the desired adjustment is obtained to prevent the cutting edge of the knife 16 from cutting into the table.

The back of the table 11 is provided with an abutment 30 against which abuts the rear face of the ice cream block to be cut into ice cream bricks, and the ice cream block is pushed over the table from the left to the right until its right-hand end abuts against a stationary gage 40 extending transversely above the right-hand end of the table 11. The gage 40 is adjustably secured by a set screw 41 to a rod 42 extending longitudinally at the back of the machine and secured by a set screw 43 in a bearing 44 attached to the post 12. The gage 40 is spaced a distance from the knife 16 corresponding to the length of the ice cream brick to be cut from the ice cream block.

It is understood that normally the knife 16 is in uppermost position, that is, with its cutting edge above the top of the ice cream block supported on the table 11, and when it is desired to cut this ice cream block into a brick it is moved from the left to the right along the abutment 30 until the right-hand end of the ice cream block abuts against the gage 40. The operator now presses the treadle 26 thus moving the knife 16 downward to cut the forward end of the ice cream block with a view to form an ice cream brick of the desired length. When this has been done the operator releases the pressure on the treadle 26 so that the latter and the knife 16 return to uppermost position. The brick is now removed and the above described operation is repeated with a view to cut off another ice cream brick from the block.

When it is desired to cut one of the ice cream bricks into slices then use is made of a second gage 50, having its hub 51 mounted to swing on the rod 42, the hub being held between the fork members 52, 53 of a sleeve 54 adjustably secured by a set screw 55 to the rod 42 so that it can be adjusted along the said rod to vary the thickness of the slices. The sleeve 54 is arranged to hold the gage 50 in inactive position as shown in the drawings, or to hold the said gage 50 in a horizontal position intermediate the knife 16 and the gage 40. In order to hold the second gage 50 in this horizontal active position, its hub 51 is provided with a lug 56 adapted to abut against the under side of the sleeve 54, as plainly shown in Fig. 4. The gage 50 when in active horizontal position is spaced a distance from the knife 16 corresponding to the thickness of the slices to be cut from the ice cream brick. It is understood that when it is desired to slice an ice cream brick then the gage 50 is swung from its inactive position forward and downward into horizontal active position, and then the brick is moved from the left to the right until the right-hand end of the brick abuts against the gage 50, after which the operator presses the treadle 26 to cause the knife 16 to cut a slice off the right-hand end of the brick. When this has been done the operator releases the treadle 26 to allow the latter and the knife to return to uppermost position after which the slice is removed and the brick is again pushed to the right against the gage 50 and the above operation is repeated to cut off another slice of the brick.

From the foregoing it will be seen that by the arrangement described an ice cream block can be quickly and accurately cut into bricks of the proper size, and each brick can be cut into slices whenever it is desired to do so.

The ice cream cutter shown and described is very simple and durable in construction and is not liable to get easily out of order.

Having thus described my invention, I claim as new and desire to secure by Letters Patent:—

1. An ice cream cutter, comprising a table adapted to support a block of ice cream, a knife mounted to move up and down above the table to cut the block into bricks or the latter into slices, a fixed gage spaced from the said knife a distance corresponding to the length of the ice cream brick, and a second gage adapted to be moved into active position intermediate the knife and the first-named gage to permit of cutting an ice cream brick into slices and adapted to be moved into inactive position when the ice cream block is being cut into bricks.

2. An ice cream cutter, comprising a table adapted to support a block of ice cream, a knife mounted to move up and down above the table to cut the block into bricks or the latter into slices, a fixed gage spaced from the said knife a distance corresponding to the length of the ice cream brick, a second gage pivotally mounted and adapted to be swung into active position intermediate the knife and the said first-named gage to permit of cutting an ice cream brick into slices, means to adjust the said second gage nearer to or farther from the said knife, and means to permit of swinging the said second gage into active position or out of active position and to hold it in this latter position during the time the ice cream block is cut into ice cream bricks.

3. An ice cream cutter, comprising a table, a post erected on the back of the table and provided with bearings, a transverse knife extending above the top of the table and provided with bearings, a transverse knife extending above the top of the table and provided with a bar mounted to slide up and down in the said bearings, an adjustable treadle mechanism connected with the said bar to move the knife up and down, the said knife when in lowermost position having its cutting edge immediately above the top of the table, a longitudinally extending rod attached to the said post, a transverse gage fixed on the said rod and extending above the table a distance from the said knife corresponding to the length of the ice cream brick to be cut by the said knife from a block of ice cream supported on the table and abutting with one end against the said gage, a second transverse gage mounted to swing on the said rod intermediate the said knife and the said first-named gage, and a forked adjusting member adjustably secured on the said rod and having its members engaging the sides of the said second gage to hold the latter against longitudinal movement after the said adjusting member is fastened in the adjusted position, the end of the ice cream brick being adapted to abut against the said second gage to permit of cutting the said brick into slices.

4. In an ice cream cutter, a table, a reciprocating knife disposed above the table near one end thereof, a longitudinally extending rod at the back of the table, a stationary gage on the rod, and a second gage pivotally and adjustably mounted on the rod between the knife and the first gage.

5. In an ice cream cutter, a table, a reciprocating cutter disposed above the table near one end thereof, a longitudinally extending rod at the rear of the table, a stationary gage on the rod, a sleeve having spaced members and adjustably mounted on the rod, and a second gage mounted on the rod between the members of the sleeve and provided with a lug adapted to engage the underside of the sleeve to hold the gage in horizontal position between the knife and first gage.

CHARLES ELMER PHENICIE.

Copies of this patent may be obtained for five cents each, by addressing the "Commissioner of Patents, Washington, D. C."